(12) United States Patent
Jung

(10) Patent No.: US 7,522,255 B2
(45) Date of Patent: Apr. 21, 2009

(54) APPARATUS FOR FILLING SEALANT AND METHOD FOR MANUFACTURING LIQUID CRYSTAL DISPLAY DEVICE USING THE SAME

(75) Inventor: An Ui Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 11/474,975

(22) Filed: Jun. 27, 2006

(65) Prior Publication Data

US 2007/0153224 A1    Jul. 5, 2007

(30) Foreign Application Priority Data

Dec. 29, 2005    (KR) ...................... 10-2005-0133122

(51) Int. Cl.
*G02F 1/1341*    (2006.01)
(52) U.S. Cl. ..................................................... 349/189
(58) Field of Classification Search ........................ None
See application file for complete search history.

(56) References Cited

U.S. PATENT DOCUMENTS

| 5,911,252 | A * | 6/1999 | Cassel ........................ 141/234 |
| 7,177,005 | B2 * | 2/2007 | Sugimura et al. ........... 349/189 |
| 7,271,904 | B2 * | 9/2007 | Jung et al. ................... 356/394 |
| 2004/0182887 | A1 * | 9/2004 | Sugimura et al. ........... 222/386 |

* cited by examiner

*Primary Examiner*—Sung H Pak
(74) *Attorney, Agent, or Firm*—McKenna Long & Aldridge LLP

(57) ABSTRACT

An apparatus for filling sealant and a method for manufacturing a liquid crystal display device using the same. The apparatus includes: an upper substrate having an inlet for receiving a sealant; and a lower substrate combined with the upper substrate having a transfer path along which the sealant supplied through the inlet is transferred and having outlets formed at ends of the transfer path that discharge the sealant.

16 Claims, 5 Drawing Sheets

APPARATUS FOR FILLING SEALANT AND METHOD FOR MANUFACTURING LIQUID CRYSTAL DISPLAY DEVICE USING THE SAME

This application claims the benefit of Korean Patent Application No. P2005-133122, filed on Dec. 29, 2005, which is hereby incorporated by reference for all purposes as if fully set forth herein.

BACKGROUND OF THE INVENTION

1. Field of the Invention

The present invention relates to a liquid crystal display device, and more particularly, to a sealant filling apparatus for a liquid crystal display device.

2. Discussion of the Related Art

A liquid crystal display device, among ultra-thin flat panel display devices with a display screen having a thickness of several tens of mm, has a low operating voltage and a low power consumption, and thus is portable, thereby being widely applied to various fields, such as notebook computers, monitors, spacecraft, and aircraft.

As shown in FIG. 1, the related art liquid crystal display device includes a lower substrate 1 and an upper substrate 3, which are opposite to each other, and a liquid crystal layer 5 formed between the lower substrate 1 and the upper substrate 3.

Although not shown in the drawings, TFTs and pixel electrodes are formed on the lower substrate 1, and a light shading layer, a color filter layer, and a common electrode are formed on the upper substrate 3.

A sealant 7, for preventing liquid crystal of the liquid crystal layer 5 from leaking and for bonding the lower substrate 1 and the upper substrate 3 to each other, is formed between the lower substrate 1 and the upper substrate 3.

The sealant 7 is deposited on one of the two substrates 1 and 3 by using a printing method or a dispensing method. Because the printing method requires contact between a printing device and the substrate 1 or 3, an orientation film formed on the substrate 1 or 3 may be negatively affected. Accordingly, a dispensing method is typically used to form the sealant today.

In the dispensing method, a syringe, which is filled with the sealant 7, moves over the substrate 1 or 3, and dispenses the sealant 7 on the substrate 1 or 3 in a designated pattern.

When the sealant 7 is deposited on the substrate 1 or 3 and when the sealant 7 contains foam, the sealant 7 breaks down, thereby causing the liquid crystal to leak to the outside and/or decreasing the adhesive strength between the substrates 1 and 3.

Accordingly, a defoamation process for removing the foam from the sealant is performed before the syringe is filled with the sealant 7. That is, the sealant 7 fills the syringe after the defoamation process.

With reference to FIG. 2, a related art process for filling syringes with a defoamed sealant will be described.

FIG. 2 is a schematic sectional view of a related art apparatus for filling syringes with a defoamed sealant.

As shown in FIG. 2, a related art sealant filling apparatus includes a main body 40 and filling rods 46 at the lower portion of the main body 40.

The main body 40 includes an inlet 43 that is connected to a defoaming tank 30 that supplies a sealant from the defoaming tank 30 to the main body 40, a transfer path 44 that transfers the sealant supplied through the inlet 43, and outlets 45 for discharging the transferred sealant to syringes 50 via the filling rods 46.

The main body 40 is generally made of a metal. The transfer path 44 passes through the main body 40 in the horizontal direction, and the outlets 45 pass through the main body 40 in the vertical direction. Accordingly, first bolts 47 are connected to both ends of the transfer path 44 passing through the main body 40 in the horizontal direction, and second bolts 48 are connected to upper ends of the outlets 45 passing through the main body 40 in the vertical direction.

Because the transfer path 44 and the outlets 45 pass through the main body 40 in the horizontal and vertical directions and the first bolts 47 and the second bolts 48 are connected to the main body 40, when the sealant, defoamed by the defoaming container 30, fills the syringes 50 through the inlet 43, the transfer path 44, and the outlets 45, the sealant may remain on the first bolts 47 and the second bolts 48 and solidify.

When the sealant is stuck to the first bolts 47 and the second bolts 48 and is solidified, the solid component of the sealant may be supplied to the syringes 50, thereby causing the syringes 50 to be poorly filled. When the poorly filled syringes 50 deposit the sealant containing the solid component on a substrate, it is impossible to uniformly deposit the sealant on the substrate.

SUMMARY OF THE INVENTION

Accordingly, the present invention is directed to a sealant filling apparatus and a method for manufacturing a liquid crystal display device using the same.

An advantage of the present invention is to provide a sealant filling apparatus that prevents a solidified component of a sealant from being supplied to syringes that are filled with the sealant.

Another advantage of the present invention is to provide a method for manufacturing a liquid crystal display device using the sealant filling apparatus, in which a sealant is uniformly deposited on a substrate.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an apparatus for filling a sealant includes: an upper substrate having an inlet for receiving a sealant; and a lower substrate combined with the upper substrate having a transfer path along which the sealant supplied through the inlet is transferred and having outlets formed at ends of the transfer path that discharge the sealant.

In another aspect of the present invention, a method for manufacturing a liquid crystal display device includes: preparing a first substrate and a second substrate; depositing a sealant on one of the first and second substrates; and forming a liquid crystal layer between the first and second substrates, wherein depositing the sealant includes defoaming the sealant; filling syringes with the defoamed sealant using a sealant filling device; and dispensing the sealant filling the syringes on one of the first and second substrates, wherein the sealant filling device includes: an upper substrate having an inlet for receiving the sealant; and a lower substrate combined with the upper substrate having a transfer path along which the sealant supplied through the inlet is transferred, and having outlets formed at ends of the transfer path that discharge the sealant It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
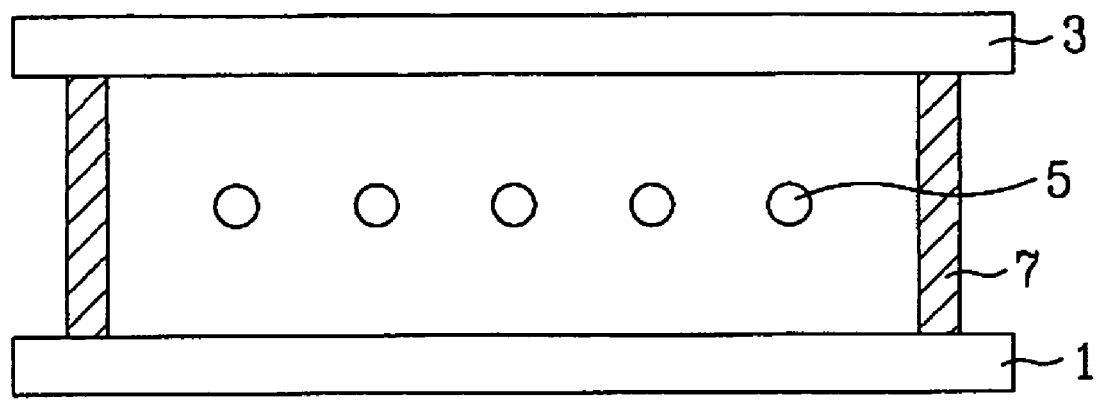
FIG. 1 is a schematic sectional view of a related art liquid crystal display device.
Figure 2:
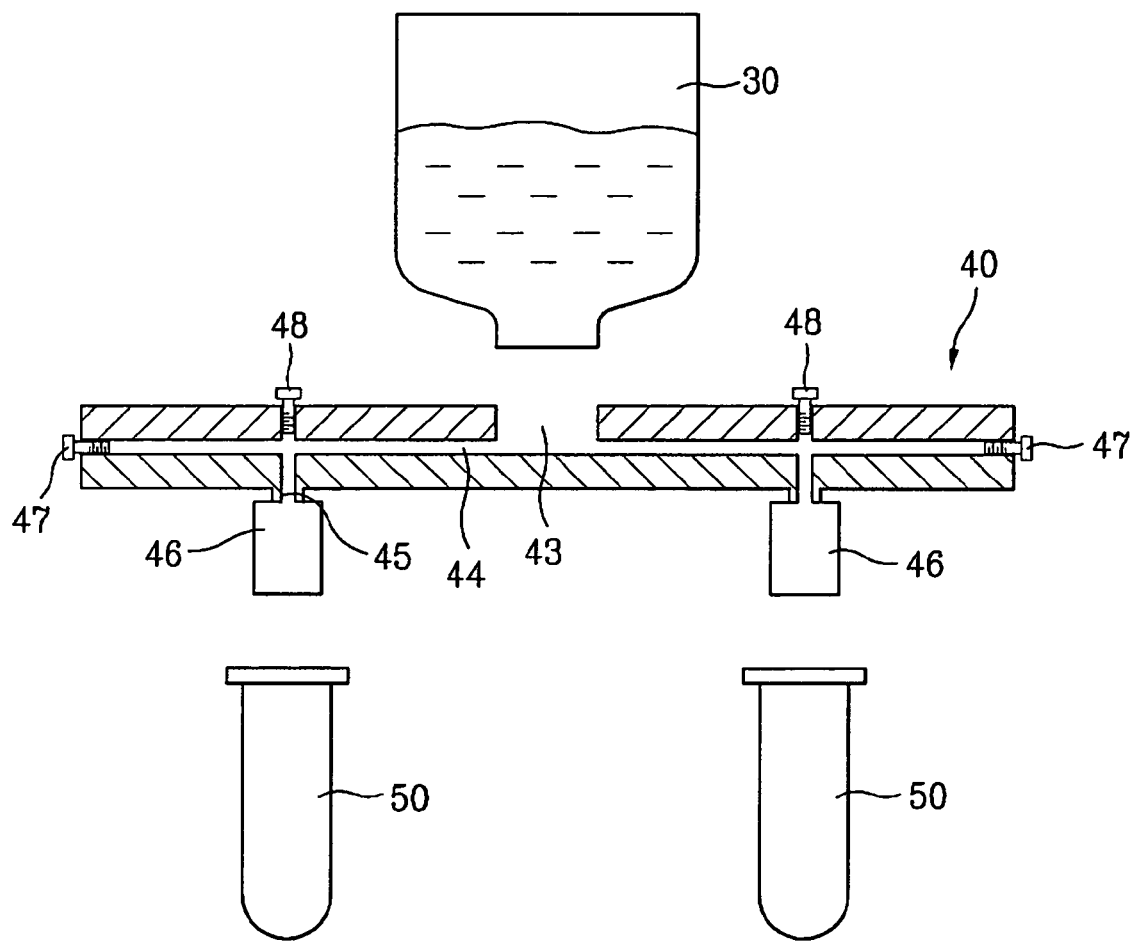
FIG. 2 is a schematic sectional view of related art apparatus for filling syringes with a defoamed sealant.
Figure 3A:
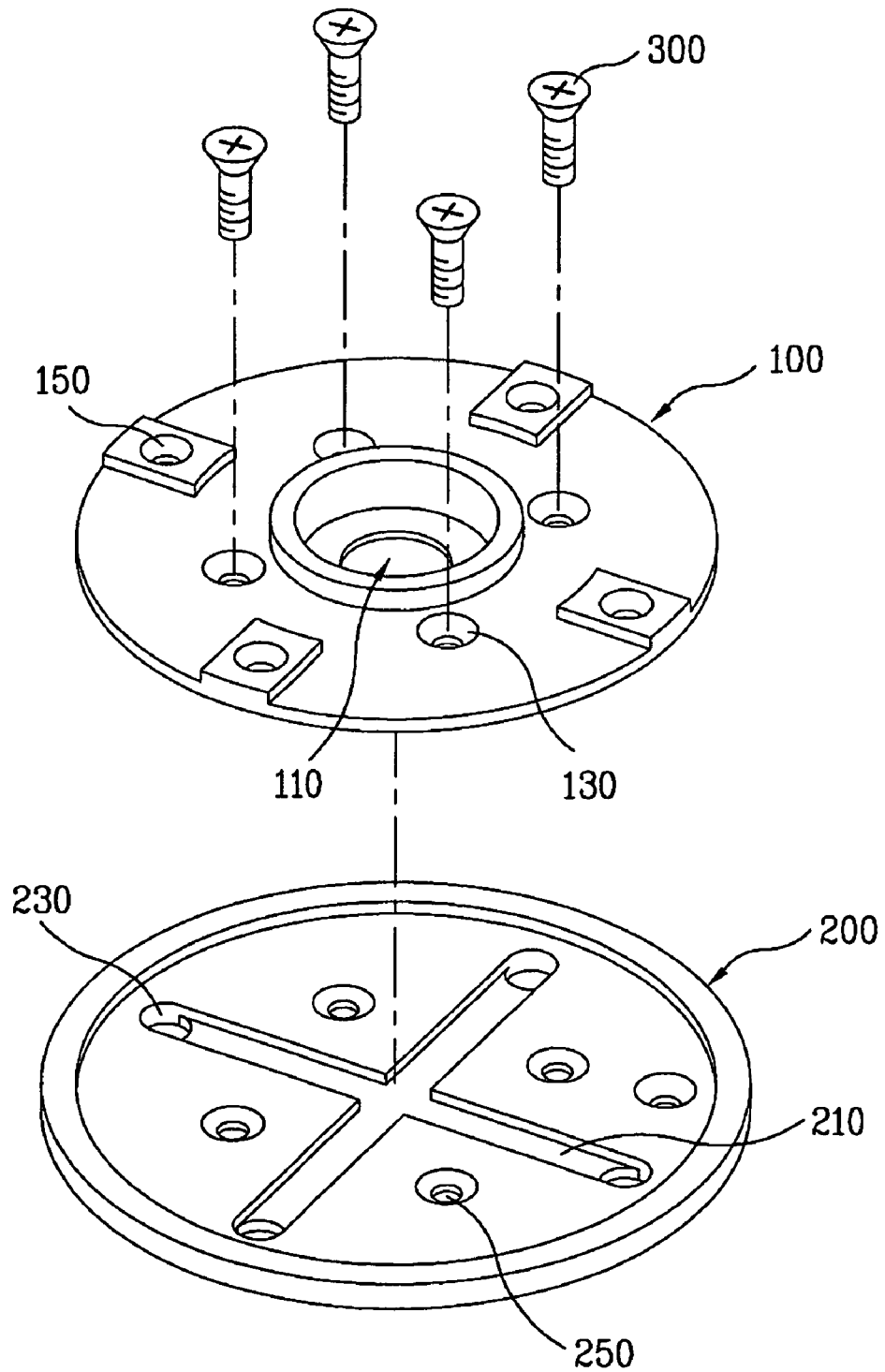
FIG. 3A is an exploded perspective view of a sealant filling apparatus in accordance with an embodiment of the present invention.
Figure 3B:
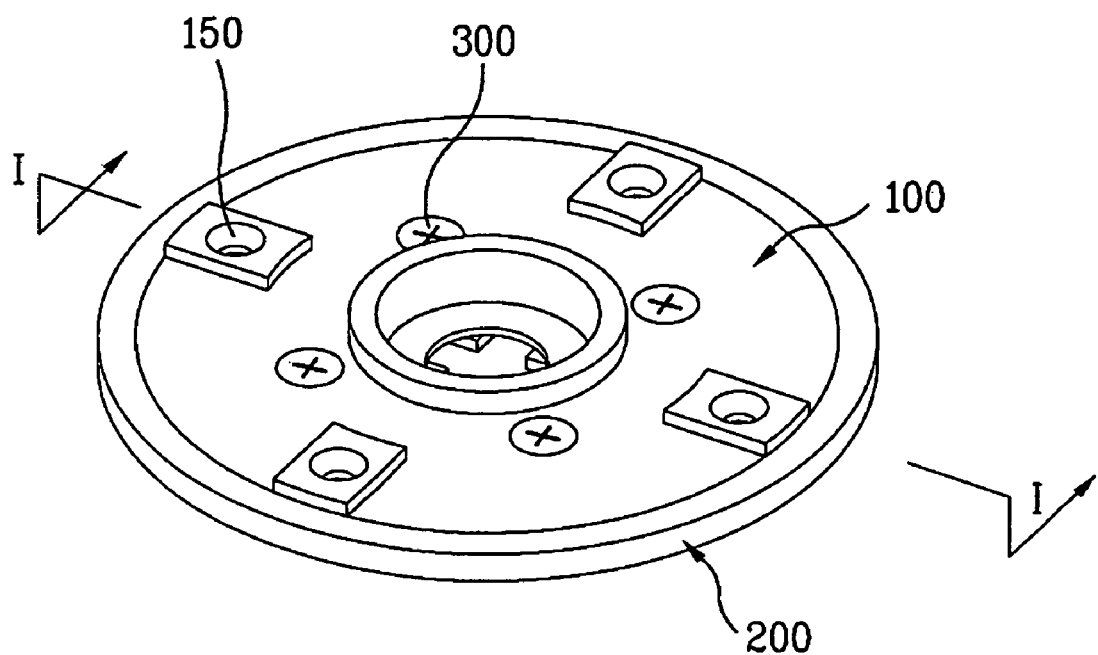
FIG. 3B is an assembled perspective view of the sealant filling apparatus in accordance with the embodiment of the present invention.
Figure 4:
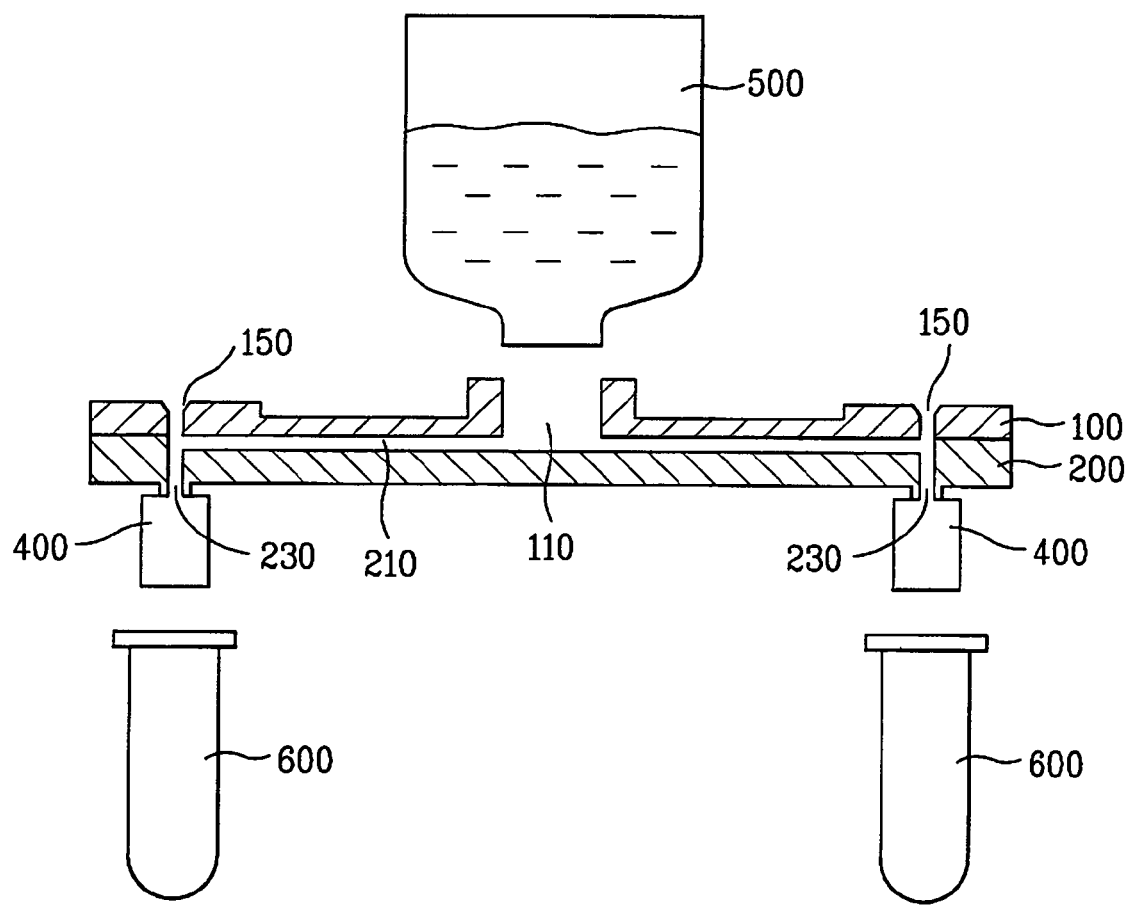
FIG. 4 is a schematic sectional view of the sealant filling apparatus in accordance with the embodiment of the present invention, taken along the line I-I of FIG. 3B.

FIG. 3A is an exploded perspective view of a sealant filling apparatus in accordance with an embodiment of the present invention, FIG. 3B is an assembled perspective view of the sealant filling apparatus in accordance with the embodiment of the present invention, and FIG. 4 is a schematic sectional view of the sealant filling apparatus in accordance with the embodiment of the present invention, taken along the line I-I of FIG. 3B.

As shown in FIGS. 3A and 3B, the sealant filling apparatus in accordance with the embodiment of the present invention includes an upper substrate 100 and a lower substrate 200.

A sealant inlet 110 for supplying a sealant to the sealant filling apparatus is formed through the upper substrate 100. The inlet 110 is formed at the central portion of the upper substrate 100.

A sealant transfer path 210 is formed in the lower substrate 200. And, a sealant outlet 230 for discharging the sealant to a syringe 600 is formed through the lower substrate 200.

The transfer path 210 serves as a path, along which the sealant supplied through the inlet 110 of the upper substrate 100 is transferred, and the transfer path 210 includes a plurality of linear grooves that cross each other centering on the inlet 110. Although the transfer channel 210 of the sealant filling apparatus of this embodiment includes two linear grooves, the number of the linear grooves of the transfer path 210 is not limited thereto.

The outlet 230 serves to discharge the sealant transferred along the transfer channel 210 to a syringe 600, and they are formed at ends of the linear grooves of the transfer path 210.

Although each of the upper substrate 100 and the lower substrate 200 of the sealant filling apparatus of this embodiment has a circular shape, the shapes of the upper substrate 100 and the lower substrate 200 are not limited thereto.

In order to bond the upper substrate 100 and the lower substrate 200 to each other, first holes 130 are formed through the upper substrate 100 and second holes 250 are formed through the lower substrate 200.

The first holes 130 and the second holes 250 are located at corresponding positions. The first substrate 100 and the lower substrate 200 are bonded to each other by inserting bolts 300 into the first holes 130 and the second holes 250. Although the number of each of the first holes 130, the second holes 250, and the bolts 300 of the sealant filling apparatus of this embodiment is four, the number thereof is not limited thereto.

The first holes 130, the second holes 250, and the bolts 300 are formed through regions of the upper and lower substrates 100 and 200 that do not include the transfer path 210, thereby allowing the sealant to be smoothly transferred and preventing the generation of solid a component in the sealant.

Preferably, third holes 150 are formed through the upper substrate 100. The third holes 150 are formed through regions of the upper substrate 100 corresponding to the outlets 230 of the lower substrate 200, thus allowing the sealant to be easily discharged through the outlets 230.

Further, filling rods 400 (in FIG. 4) are connected to the outlets 230 of the lower substrate 200.

With reference to FIG. 4, a process for filling syringes with a sealant using the sealant filling apparatus in accordance with an embodiment of the present invention will be described.

As shown in FIG. 4, a sealant filling a sealant defoaming container 500 is supplied to the sealant filling apparatus through the inlet 110 of the upper substrate 100. Then, the sealant supplied to the inlet 110 is transferred along the sealant transfer channel 210 of the lower substrate 200. Then, the sealant transferred along the sealant transfer path 210 is discharged to the filling rods 400 through the outlets 230 formed at the ends of the sealant transfer path 210 filling syringes 600 connected to the lower parts of the filling rods 400.

While the sealant is supplied to the sealant filling apparatus through the inlet 110 of the upper substrate 100, is transferred along the sealant transfer path 210 of the lower substrate 200, and is discharged through the outlets 230, the sealant filling apparatus does not have any space where the sealant remains, thus preventing the generation of a solid component of the sealant. Accordingly, the sealant filling the syringes 600 does not contain a solid component.

A method for manufacturing liquid crystal display device will now be described.

First, a first substrate and a second substrate are prepared.

The first substrate and the second substrate are prepared according to driving modes of a liquid crystal display device.

When the liquid crystal display device is a Twisted Nematic (TN) mode liquid crystal display device it includes a first and second substrate. The first substrate includes gate lines and data lines that cross with each other defining pixel regions, TFTs formed at the crossings between the gate lines and the data lines and serving as switching elements, and pixel electrodes formed in the pixel regions and serving as electrodes for forming an electric field. The second substrate includes a light shielding layer for preventing light from leaking, a color filter layer for displaying colors, and a common electrode serving as the other electrode for forming the electric field.

When the liquid crystal display device is in an In Plane Switching (IPS) mode liquid crystal display device it includes a first and second substrate. The first substrate includes gate lines and data lines that cross with each other defining pixel regions, TFTs formed at the crossings between the gate lines and the data lines and serving as switching elements, and pixel electrodes and a common electrode formed in parallel in the pixel regions and serving as pairs of electrodes for forming a horizontal electric field. The second substrate includes a light shielding layer for preventing light from leaking and a color filter layer for displaying colors.

Next, a sealant is defoamed. The defoamation of the sealant is performed by filling a designated defoaming container with the sealant, locating the designated defoaming container filled with the sealant in a drum provided with a rotary shaft, and rotating the defoaming container. However, the defoamation of the sealant is not limited thereto, and may be performed by various known methods.

Then, the syringes are filled with defoamed sealant. The filling of the syringes with the defoamed sealant is performed using the above-described sealant filling apparatus.

Thereafter, the sealant filling the syringes is deposited on one of the first and second substrates by dispensing. The pattern of the deposited sealant is varied according to methods for forming a liquid crystal layer. That is, the deposited sealant may have a pattern with or without a liquid crystal inlet.

Thereafter, the liquid crystal layer is formed between the first and second substrates. The formation of the liquid crystal layer is performed by a vacuum injection method or a liquid crystal dropping or dispensing method.

In the vacuum injection method, the sealant is deposited on one of the first and second substrates so that the deposited sealant has a pattern with a liquid crystal inlet, the first and second substrates are bonded to each other, and liquid crystal is injected through the liquid crystal inlet between the bonded substrates.

In the liquid crystal dropping method, the sealant is deposited on one of the first and second substrates so that the deposited sealant has a pattern without a liquid crystal inlet, liquid crystal is dropped on one of the first and second substrates, and the first and second substrates are bonded to each other.

As apparent from the above description, the present invention provides a sealant filling apparatus that includes an upper substrate provided with a sealant inlet formed therethrough and a lower substrate provided with a sealant transfer path and sealant outlets formed therein and therethrough so that sealant does not remain in the sealant filling apparatus, and a method for manufacturing a liquid crystal display device using the same, thereby preventing the generation of a solid component of the sealant and thereby allowing the uniform deposition of the sealant.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A sealant filling apparatus comprising:
   an upper substrate having an inlet for receiving a sealant; and
   a lower substrate combined with the upper substrate having a transfer path along which the sealant supplied through the inlet is transferred and having outlets formed at ends of the transfer path that discharge the sealant;
   wherein first holes and second holes are formed through the upper substrate and the lower substrate, and the upper and lower substrates are combined by bolts fixed into the first holes and the second holes;
   wherein the first holes, the second holes, and the bolts are formed in regions of the upper and lower substrates that do not include the transfer path.

2. The apparatus of claim 1, wherein the inlet of the upper substrate is located at the central position of the upper substrate.

3. The apparatus of claim 1, wherein the transfer path of the lower substrate includes a plurality of linear grooves that cross each other at the inlet of the upper substrate.

4. The apparatus of claim 1, wherein third holes are formed through the upper substrate at regions corresponding to the outlets of the lower substrate.

5. The apparatus of claim 1, further comprising filling rods connected to the outlets of the lower substrate.

6. The apparatus of claim 1, wherein the upper substrate and the lower substrate have a circular shape.

7. A method for manufacturing a liquid crystal display device comprising:
   preparing a first substrate and a second substrate;
   forming a sealant on one of the first and second substrates; and
   forming a liquid crystal layer between the first and second substrates,
   wherein forming the sealant includes:
   defoaming the sealant;
   filling syringes with the defoamed sealant using a sealant filling device; and
   dispensing the sealant filling the syringes on one of the first and second substrates;
   wherein the sealant filling device includes:
   an upper substrate having an inlet for receiving the sealant; and
   a lower substrate combined with the upper substrate having a transfer path along which the sealant supplied through the inlet is transferred, and having outlets formed at ends of the transfer path that discharge the sealant;
   wherein first holes and second holes are formed through the upper substrate and the lower substrate, and the upper and lower substrates are combined by bolts fixed into the first holes and the second holes;
   wherein the first holes, the second holes, and the bolts are formed in regions of the upper and lower substrates that do not include the transfer path.

8. The method of claim 7, wherein the inlet of the upper substrate is located at the central position of the upper substrate.

9. The method of in claim 7, wherein the transfer path of the lower substrate comprises a plurality of linear grooves that cross each other centering on the inlet of the upper substrate.

10. The method of claim 7, wherein third holes are formed through the upper substrate at regions corresponding to the outlets of the lower substrate.

11. The method of claim 7, wherein the sealant filling device further includes filling rods connected to the outlets of the lower substrate.

12. The method of claim 7, wherein the upper substrate and the lower substrate have a circular shape.

13. The method of claim 7, wherein forming the liquid crystal layer includes:
   dispensing liquid crystal on one of the first and second substrates; and
   bonding the first and second substrates to each other.

14. The method of claim 7, wherein defoaming the sealant includes:
- filling a defoaming container with the sealant;
- positioning the defoaming container in a drum having a rotary shaft; and
- rotating the defoaming container.

15. A sealant filling apparatus comprising:
- an upper substrate having an inlet for receiving a sealant; and
- a lower substrate combined with the upper substrate having a transfer path along which the sealant supplied through the inlet is transferred and having outlets formed at ends of the transfer path that discharge the sealant,
- wherein the transfer path of the lower substrate includes a plurality of linear grooves that cross each other at the inlet of the upper substrate, and
- wherein first holes and second holes are formed through the upper substrate and the lower substrate, and the upper and lower substrates are combined by bolts fixed into the first holes and the second holes;
- wherein the first holes, the second holes, and the bolts are formed in regions of the upper and lower substrates that do not include the transfer path;
- wherein third holes are formed through the upper substrate at regions corresponding to the outlets of the lower substrate.

16. The apparatus of claim 15, further comprising filling rods connected to the outlets of the lower substrate.

* * * * *